(12) United States Patent　(10) Patent No.: US 10,924,715 B2
Nakamura　(45) Date of Patent: Feb. 16, 2021

(54) OPTICAL MODULE, METHOD FOR CONTROLLING THE SAME, AND PROJECTION-TYPE DISPLAY APPARATUS

(71) Applicant: SEIKO EPSON CORPORATION, Tokyo (JP)

(72) Inventor: Norio Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/825,156

(22) Filed: Mar. 20, 2020

(65) Prior Publication Data

US 2020/0304763 A1　Sep. 24, 2020

(30) Foreign Application Priority Data

Mar. 22, 2019　(JP) ................. 2019-054298

(51) Int. Cl.
*H04N 9/31*　(2006.01)
*H04N 5/64*　(2006.01)

(52) U.S. Cl.
CPC ......... *H04N 9/3117* (2013.01); *H04N 9/3155* (2013.01)

(58) Field of Classification Search
CPC ...... H04N 9/31; H04N 9/3117; H04N 9/3155; H04N 5/64
USPC .................... 348/760, 744; 353/31
See application file for complete search history.

(56) References Cited

U.S. PATENT DOCUMENTS

| | | | | |
|---|---|---|---|---|
| 6,793,351 B2 * | 9/2004 | Nelson | ................. | H04N 9/3105 348/745 |
| 7,918,560 B2 * | 4/2011 | Miyazawa | ......... | G03B 21/2073 353/20 |
| 9,091,910 B2 * | 7/2015 | Koyama | .............. | H04N 9/3141 |
| 9,097,907 B2 * | 8/2015 | Endo | ....................... | G02B 30/25 |
| 9,250,507 B2 * | 2/2016 | Narimatsu | ............ | G02F 1/1313 |
| 9,860,499 B2 * | 1/2018 | Mizoguchi | ......... | G02B 27/0905 |
| 9,900,565 B2 * | 2/2018 | Miyasaka | .............. | G03B 17/54 |
| 10,345,690 B2 * | 7/2019 | Nagumo | .............. | G03B 21/145 |

(Continued)

FOREIGN PATENT DOCUMENTS

JP　H04-063332 A　2/1992
JP　2019-53241 A　4/2019

OTHER PUBLICATIONS

Oct. 20, 2020 Office Action issued in U.S. Appl. No. 16/825,139.
U.S. Appl. No. 16/825,139, filed Mar. 20, 2020 in the name of Norio Nakamura.

*Primary Examiner* — Trang U Tran

(74) *Attorney, Agent, or Firm* — Oliff PLC

(57) ABSTRACT

An optical module includes a light modulator that modulates light and includes a plurality of pixels, and a pixel shift mechanism. The pixels of the light modulator each include a first sub-pixel on which a first color light flux is incident, a second sub-pixel on which a second color light flux is incident, a third sub-pixel on which a third color light flux is incident, and a fourth sub-pixel on which one of the first color light flux, the second color light flux, and third color light flux is incident. The pixel shift mechanism includes a first state, a second state, and a third state. The first color light flux is incident on the fourth sub-pixel in the first state. The second color light flux is incident on the fourth sub-pixel in the second state. The third color light flux is incident on the fourth sub-pixel in the third state.

12 Claims, 4 Drawing Sheets

(56) References Cited

U.S. PATENT DOCUMENTS

| | | | |
|---|---|---|---|
| 10,460,637 B2* | 10/2019 | Ohkoba | G09G 3/003 |
| 10,564,528 B2* | 2/2020 | Kodama | H04N 9/3126 |
| 2005/0099534 A1 | 5/2005 | Aufranc et al. | |
| 2014/0313448 A1* | 10/2014 | Kinoe | G02F 1/136209 |
| | | | 349/46 |

* cited by examiner

FIG. 4
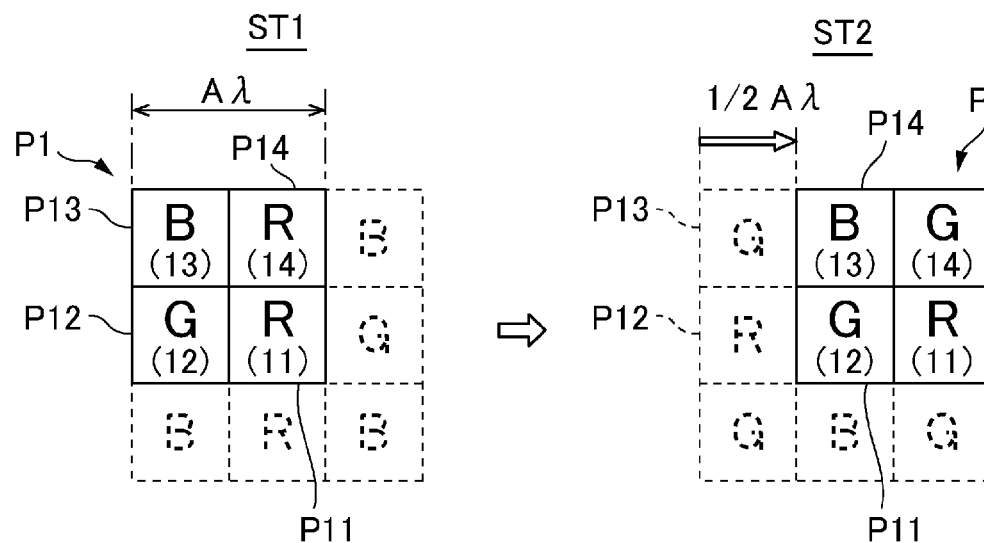
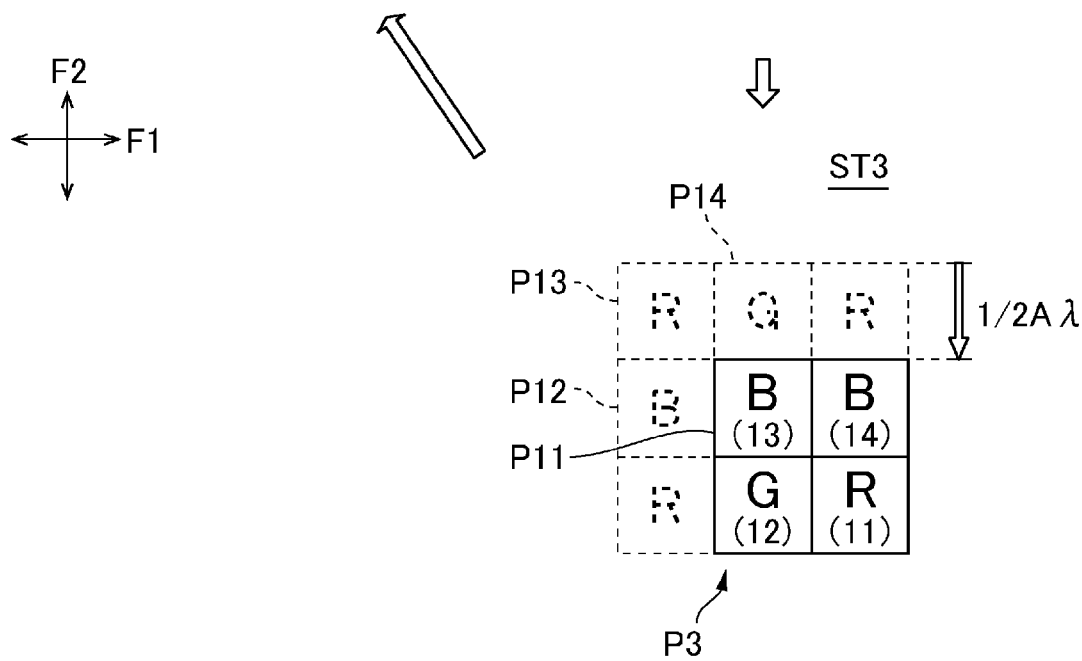

OPTICAL MODULE, METHOD FOR CONTROLLING THE SAME, AND PROJECTION-TYPE DISPLAY APPARATUS

The present application is based on, and claims priority from JP Application Serial Number 2019-054298, filed Mar. 22, 2019, the disclosure of which is hereby incorporated by reference herein in its entirety.

BACKGROUND

1. Technical Field

The present disclosure relates to an optical module, a method for controlling the same, and a projection-type display apparatus.

2. Related Art

JP-A-4-63332 discloses a single-plate projector using one liquid crystal panel as a light modulator. The projector includes a liquid crystal panel for polarization direction control that functions as a pixel shift mechanism that shifts the optical path of video image light having passed through the liquid crystal panel to shift the position of each pixel projected on a screen. The liquid crystal panel for polarization direction control shifts the optical path in a predetermined direction by switching applied voltage from ON to OFF and vice versa. Pixel shift that moves the pixel position of each pixel projected on the screen is thus performed.

In JP-A-4-63332, an image signal representing pixels the number of which is greater than the number of pixels of the liquid crystal panel is broken down into a plurality of image signals, which are then displayed in a time division manner in synchronization with the shift operation. For example, to perform pixel shift that shifts the pixels by half the pixel interval in one direction (such as horizontal direction or 45-degree oblique direction), an image displayed in the form of one frame is broken down into two images, which are switched from one to the other in synchronization with the shift operation. On the other hand, to perform pixel shift that shifts the pixels by half the pixel interval in two directions (horizontal and vertical directions), an image displayed in the form of one frame is broken down into four images, and the displayed image is switched from one of the four images to another in synchronization with the shift operation because the combination of the shift directions creates four shift positions. As a result, since the image displayed on the screen is switched from one of the four images to another in synchronization with the pixel shift using pixel shift interval smaller than the pixel interval, the apparent number of pixels can be increased, whereby the resolution of the image projected on the screen can be increased.

In the method for increasing the resolution of a displayed image based on the pixel shift, images corresponding to the shift positions are displayed in a time division manner in one frame in accordance with the number of shift positions. It is therefore necessary to drive the liquid crystal panel and the pixel shift mechanism at high speed, and fast-response driving of the liquid crystal panel and the pixel shift mechanism is therefore required. For example, to display images each formed of 60 frames per second, and to change each of the images four times in one frame in synchronization with the shift operation, the liquid crystal panel needs to switch the contents displayed at the pixels in a cycle of 1/240 (sec) (240 Hz).

In the case of a liquid crystal panel, however, it takes time for the liquid crystal material to respond to a change in pixel potential, so that asynchronization between each of the images displayed in a time division manner and the corresponding shift position could occur. It is therefore difficult to allow the pixel shift to improve the display quality.

SUMMARY

An optical module according to the present disclosure is an optical module including a light modulator that modulates light incident thereon on a pixel basis and a pixel shift mechanism. The pixels of the light modulator each include a first sub-pixel on which a first color light flux is incident, a second sub-pixel on which a second color light flux is incident, a third sub-pixel on which a third color light flux is incident, and a fourth sub-pixel on which any of the first color light flux, the second color light flux, and third color light flux is incident. The pixel shift mechanism transitions to a first state in which a light flux modulated by the first sub-pixel is incident on a first position, a second state in which the light flux modulated by the first sub-pixel is incident on a second position, and a third state in which the light flux modulated by the first sub-pixel is incident on a third position. When the pixel shift mechanism operates in the first state, the first color light flux is incident on the fourth sub-pixel. When the pixel shift mechanism operates in the second state, the second color light flux is incident on the fourth sub-pixel. When the pixel shift mechanism operates in the third state, the third color light flux is incident on the fourth sub-pixel.

A projection-type display apparatus according to the present disclosure includes the optical module described above and a projection optical system that enlarges and projects video image light incident from the optical module.

An optical module controlling method according to the present disclosure is a method for controlling an optical module including a light modulator that modulates light incident thereon on a pixel basis and a pixel shift mechanism. The pixels of the light modulator each include a first sub-pixel on which a first color light flux is incident, a second sub-pixel on which a second color light flux is incident, a third sub-pixel on which a third color light flux is incident, and a fourth sub-pixel on which any of the first color light flux, the second color light flux, and the third color light flux is incident. The method includes causing the first color light flux to be incident on the fourth sub-pixel when a light flux modulated by the first sub-pixel is incident on a first position, causing the second color light flux to be incident on the fourth sub-pixel when the light flux modulated by the first sub-pixel is incident on a second position, and causing the third color light flux to be incident on the fourth sub-pixel when the light flux modulated by the first sub-pixel is incident on a third position.

BRIEF DESCRIPTION OF THE DRAWINGS

FIG. 4 is a state transition diagram showing changes in shift position resulting from pixel shift and changes in color light fluxes incident on sub-pixels.

DESCRIPTION OF EXEMPLARY EMBODIMENTS

Figure 1:
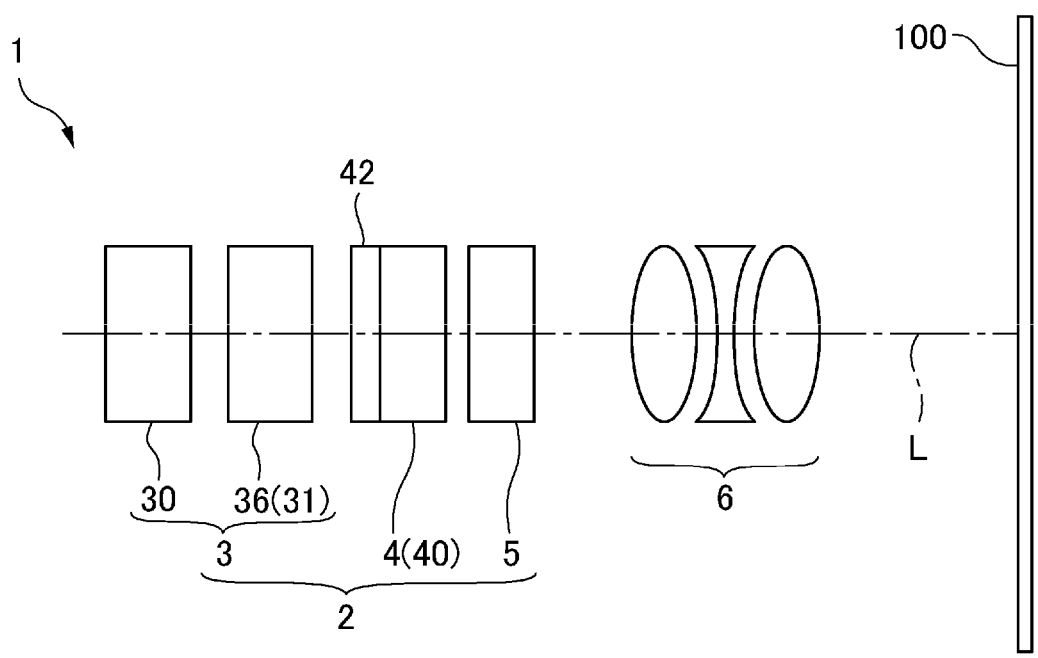
FIG. 1 is a descriptive diagram showing the optical configuration of a projector that is an example of a projection-type display apparatus including an optical module according to an embodiment of the present disclosure.

An exemplary embodiment of the present disclosure will be described below with reference to the drawings. FIG. 1 is a descriptive diagram showing the optical configuration of a projector 1, which is an example of a projection-type display apparatus including an optical module 2 according to the present embodiment. The projector 1 is an apparatus that displays video images on a screen 100 based on an externally inputted video signal. The projector 1 includes the optical module 2 and a projection optical system 6. The optical module 2 includes a light source section 3, a light modulator 4 and a pixel shift mechanism 5. The projector 1 shown in FIG. 1 is what is called a single-plate projector in which one light modulator 4 modulates three color light fluxes, R light (red light), G light (green light), and B light (blue light). In the present specification, the R light (red light) is a first color light flux, the B light (blue light) is a second color light flux, and the G light (green light) is a third color light flux.

The light source section 3 includes a light source 30, which outputs the R light, the G light, and the B light, and an optical system 31, which causes the R light, the G light, and the B light outputted from the light source 30 to be incident on each pixel of the light modulator 4. The light source 30 can, for example, be a laser light source, such as a semiconductor laser. The light source 30 may have a configuration different from the configuration of a laser light source. For example, dichroic mirrors that selectively reflect the R light, the G light, and the B light, color filters that selectively transmit the R light, the G light, and the B light, and other optical elements and a white light source may be used to output the R light, the G light, and the B light.

The light modulator 4, specifically, each pixel 10 thereof modulates the R light, the G light, and the B light outputted from the light source section 3 in accordance with image information to produce full-color video image light L. In the present embodiment, the light modulator 4 is a transmissive liquid crystal panel 40. The video image light L outputted from the light modulator 4 enters the projection optical system 6 via the pixel shift mechanism 5, and the projection optical system 6 enlarges the video image light L and projects the enlarged video image light L on the screen 100.

Figure 2:
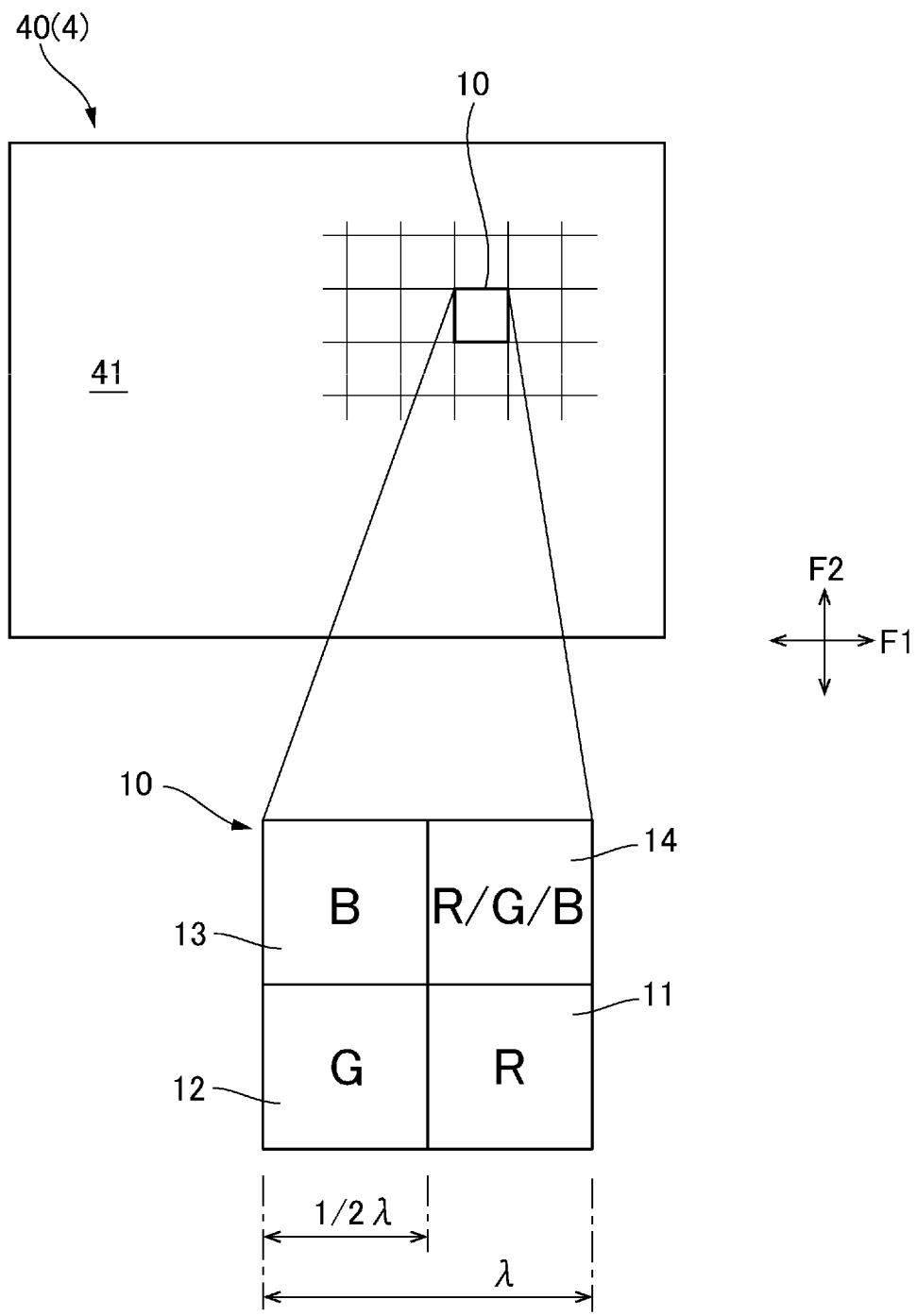
FIG. 2 is a descriptive diagram diagrammatically showing the planar configuration of pixels of a liquid crystal panel.

FIG. 2 is a descriptive diagram diagrammatically showing the planar configuration of the pixels 10 of the liquid crystal panel 40. The pixels 10 are arranged in a matrix in a display area 41 of the liquid crystal panel 40. In FIG. 2, the pixels 10 are displayed at a scale greater than the actual scale. The pixels 10 each include four sub-pixels arranged in two directions in the form of lattice, two sub-pixels arranged in a first direction F1, which is the scan direction of the liquid crystal panel 40, and two sub-pixels arranged in a second direction F2, which is perpendicular to the first direction F1. The pixels 10 each include a first sub-pixel 11, a second sub-pixel 12, a third sub-pixel 13, and a fourth sub-pixel 14, as shown in FIG. 2. The first sub-pixel 11 and the second sub-pixel 12 are arranged in the first direction F1, so are the third sub-pixel 13 and the fourth sub-pixel 14. The second sub-pixel 12 and the third sub-pixel 13 are arranged in the second direction F2, so are the first sub-pixel 11 and the fourth sub-pixel 14. The second sub-pixel 12 and the fourth sub-pixel 14 are arranged in the first direction F1 in positions different in the second direction F2 from the positions of the first sub-pixel 11 and the third sub-pixel 13.

The four sub-pixels that form each of the pixels 10 receive the R light, the G light, and the B light as follows: The R light is incident on the first sub-pixel 11. The G light is incident on the second sub-pixel 12. The B light is incident on the third sub-pixel 13. Any of the R light, the G light, and the B light is incident on the fourth sub-pixel 14.

The liquid crystal panel 40 includes a microlens array 42, in which microlenses are arranged at the same interval as a pixel interval λ in the liquid crystal panel 40, as shown in FIG. 1. The R light and the B light incident on the microlens array 42 at angles different from one another are collected and directed to different sub-pixels in each of the pixels 10 of the light modulator 4. The optical system 31 includes an incident light changing mechanism 36, which switches the color light flux incident on the fourth sub-pixel 14.

Figure 3:
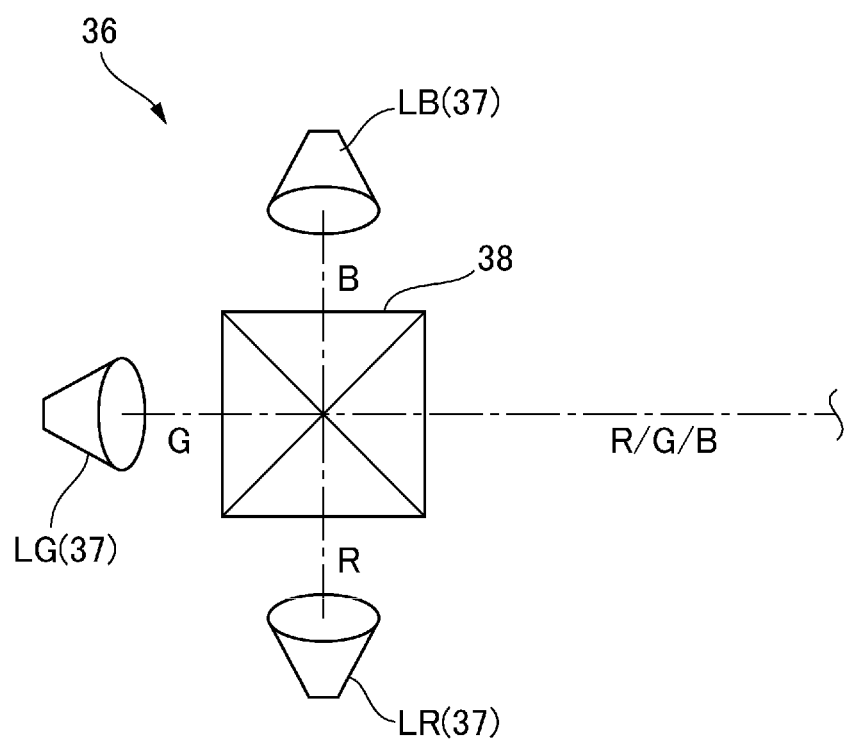
FIG. 3 is a descriptive diagram diagrammatically showing an incident light changing mechanism.

FIG. 3 is descriptive diagram diagrammatically showing the incident light changing mechanism 36. The incident light changing mechanism 36 includes a light source 37 for a fourth sub-pixel, which outputs the color light fluxes to be incident on the fourth sub-pixel 14, and an optical element 38, which the color light fluxes outputted from the light source 37 for a fourth sub-pixel enter. In the present embodiment, the light source 37 for a fourth sub-pixel is provided separately from the light source 30, which outputs the color light fluxes to be incident on the other sub-pixels. The light source 37 for a fourth sub-pixel includes one laser light source LR for R light, one laser light source LG for G light, and one laser light source LB for B light. The laser light source LR for R light, the laser light source LG for G light, and the laser light source LB for B light are so turn-on/off controlled that only one of the laser light sources is selectively turned on.

The color light fluxes that enter the optical element 38 from the laser light source LR for R light, the laser light source LG for G light, and the laser light source LB for B light exit out of the optical element 38 along the same optical path, enters the microlens array 42, and are incident on the fourth sub-pixel 14. The R light, the G light, and the B light are therefore selectively incident on the fourth sub-pixel 14 by the turn-on/off control of the laser light source LR for R light, the laser light source LG for G light, and the laser light source LB for B light of the light source 37 for a fourth sub-pixel.

The pixel shift mechanism 5 is disposed between the light modulator 4 and the projection optical system 6. The pixel shift mechanism 5 shifts the position where the video image light L outputted from the light modulator 4 is projected on the screen 100 (performs what is called pixel shift). The pixel shift mechanism 5 is, for example, a mechanism that shifts the optical path of the video image light L based on refraction by changing the attitude of an actuator-driven light transmissive substrate that transmits the video image light L, such as a glass plate.

The pixel shift mechanism 5 shifts the optical path of the video image light L in a predetermined direction. In the present embodiment, the pixel shift mechanism 5 shifts the optical path of the video image light L in the first direction F1 and in the second direction F2, which is perpendicular to the first direction F1. The pixels 10 displayed on the screen 100 are thus so displayed as to be shifted in the first direction F1 and the second direction F2.

In the present embodiment, the pixel shift mechanism 5 shifts the optical path in the first direction F1 and in the second direction F2, which are the directions in which the sub-pixels that form each of the pixels 10 are arranged. The pixels 10 displayed on the screen 100 are thus so displayed as to be shifted in the first direction F1 and the second direction F2. The pixel shift mechanism 5 includes a mechanism that swings the light transmissive substrate that transmits the video image light L around a predetermined axial line as the mechanism that shifts the optical path in the first direction F1 and the second direction F2. For example, to shift the optical path in the first direction F1, the light transmissive substrate is swung around a first axial line perpendicular to the first direction F1. To shift the optical path in the second direction F2, the light transmissive substrate is swung around a second axial line perpendicular to the second direction F2.

The pixel shift mechanisms does not necessarily have the configuration described above. For example, the pixel shift mechanism 5 may instead be configured to electrically change the state of refraction performed by an optical element that transmits the video image light L. A panel shift mechanism can still instead be used. In this case, a piezoelectric actuator, a stepper motor, or any other actuator is used to move the liquid crystal panel 40 itself in a pixel shift direction to shift the position where the video image light L is projected on the screen 100.

In the present embodiment, the pixel shift operation performed by the pixel shift mechanism 5 and the operation of swapping the color light fluxes incident on the fourth sub-pixel 14 are synchronously performed to increase the resolution of a full-color display image displayed on the screen 100. The control that allows the pixel shift operation and the swap of the color light fluxes incident on the fourth sub-pixel 14 to be synchronously performed will be described below.

FIG. 4 is a state transition diagram showing changes in the shift position resulting from the pixel shift and changes in the color light fluxes incident on the sub-pixels. A first shift position P1, a second shift position P2, and a third shift position P3 shown in FIG. 4 are the on-projection-surface positions where the video image light L is projected and are, in the present embodiment, positions on the screen 100 that are the positions where the video image light L modulated by the pixels 10 is projected. As shown in FIG. 2, the pixel interval on the screen 100 is Aλ, where the pixel interval in the liquid crystal panel 40 is λ, and the projection magnification in the projection on the screen 100 is A. As shown in FIG. 4, the light fluxes modulated by the sub-pixels of each of the pixels 10 of the liquid crystal panel 40 are sequentially projected on the three shift positions on the screen 100 achieved by the pixel shift in the two directions, the first direction F1 and the second direction F2. The three shift positions are the first shift position P1, the second shift position P2 shifted from the first shift position P1 in the first direction F1 by half the pixel interval Aλ, and the third shift position P3 shifted from the second shift position P2 in the second direction F2 by half the pixel interval Aλ. In the present embodiment, the pixels 10 are displayed for a fixed period in the first shift position P1, the second shift position P2, and the third shift position P3 in this order.

The pixel shift mechanism 5 transitions to a first state, a second state, and a third state by combining the shift operation of shifting the optical path of the video image light L in the first direction F1 and the shift operation of shifting the optical path of the video image light L in the second direction F2. The first state is a state in which the light fluxes modulated by each of the pixels 10 are incident on the first shift position P1. The second state is a state in which the light fluxes modulated by each of the pixels 10 are incident on the second shift position P2. The third state is a state in which the light fluxes modulated by each of the pixels 10 are incident on the third shift position P3. In the present embodiment, the pixel shift mechanism 5 changes the optical path of the video image light L by swinging the light transmissive substrate. The first state is therefore the state in which the light transmissive substrate is so located that the video image light L is incident on the first shift position P1. The second state is the state in which the light transmissive substrate is so located that the video image light L is incident on the second shift position P2. The third state is the state in which the light transmissive substrate is so located that the video image light L is incident on the third shift position P3.

The color light flux incident on the fourth sub-pixel 14 changes in synchronization with the changes in the shift position. In the present embodiment, the R light is incident on the fourth sub-pixel 14 in the first shift position P1, the G light is incident on the fourth sub-pixel 14 in the second shift position P2, and the B light is incident on the fourth sub-pixel 14 in the third shift position P3. That is, when the pixel shift mechanism 5 operates in the first state, the R light is incident on the fourth sub-pixel 14. When the pixel shift mechanism 5 operates in the second state, the G light is incident on the fourth sub-pixel 14. When the pixel shift mechanism 5 operates in the third state, the B light is incident on the fourth sub-pixel 14.

The optical module 2 carries out the following three steps once in a one-frame period in which the display screen of the liquid crystal panel 40 is rewritten once: a first display step ST1 of displaying the pixels 10 in the first shift position P1; a second display step ST2 of displaying the pixels 10 in the second shift position P2; and a third display step ST3 of displaying the pixels 10 in the third shift position P3. That is, in the present embodiment, the pixel shift is performed in the two directions, but the number of shift positions is three. The shift position is therefore moved in the cycle that is one-third the one-frame rewriting cycle. For example, when images each formed of 60 frames per second are displayed, the shift position is moved 180 times per second or in a cycle of 180 Hz.

In the present specification, the first shift position P1, which is the projection position on the screen 100 where the light fluxes modulated by each of the pixels 10 are projected, is divided into four areas in the form of a lattice, two areas in the first direction F1 and two areas in the second direction F2, and the four areas are called a first position P11, a second position P12, a third position P13, and a fourth position P14, as shown in FIG. 4. The first position P11, the second position P12, the third position P13, and the fourth position P14 are areas arranged at the pixel interval that is half the pixel interval Aλ on the screen 100. The first position P11 and the second position P12 are arranged in the first direction F1, which is the pixel shift direction, and the third position P13 and the fourth position P14 are arranged in the first direction F1 but differ in the second direction F2, which intersects the first direction F1, from the first position P11 and the second position P12.

The pixel shift mechanism 5 performs the following three types of shift operation: first shift operation in which the state of the pixel shift mechanism 5 transitions from the first state to the second state, second shift operation in which the state of the pixel shift mechanism 5 transitions from the second state to the third state, and third shift operation in which the state of the pixel shift mechanism 5 transitions from the third state to the first state. The first shift operation is operation of shifting the projection position of the video image light L on the screen 100 toward one side of the first direction F1. The second shift operation is operation of shifting the projection position of the video image light L on the screen 100 toward one side of the second direction F2. The third shift operation is operation of shifting the projection position of the video image light L on the screen 100 toward the other side of the first direction F1 and the other side of the second direction F2. Performing the first shift operation, the second shift operation, and the third shift operation each once therefore causes the light fluxes modulated by each of the pixels 10 to be projected on the first shift position P1, the second shift position P2, and the third shift position P3 in this order once and return to the first shift position P1.

In the present embodiment, the first shift operation is operation of swinging the light transmissive substrate toward one side around the first axial line perpendicular to the first direction F1, and the second shift operation is operation of swinging the light transmissive substrate toward the one side around the second axial line perpendicular to the second direction F2. The third shift operation is the combination of the operation of swinging the light transmissive substrate toward the other side around the first axial line and the operation of swinging the light transmissive substrate toward the other side around the second axial line.

In the first state, the light flux modulated by the first sub-pixel 11 (R light) is incident on the first position P11. In the second state, the light flux modulated by the first sub-pixel 11 (R light) is incident on the second position P12. In the third state, the light flux modulated by the first sub-pixel 11 (R light) is incident on the third position P13.

In the present embodiment, in a one-frame period, the light fluxes modulated by each of the pixels 10 are shifted to the three shift positions and further, the color light flux incident on the fourth sub-pixel 14 is switched, whereby all the color light fluxes, the R light, the G light, and the B light, are projected in a time division manner in the one-frame period on the first position P11, the second position P12, the third position P13, and the fourth position P14.

The color light flux incident on the first position P11 transitions as follows: In the first state, the light flux modulated by the first sub-pixel 11 (R light) is incident on the first position P11. In the second state, as a result of the pixel shift in the first direction F1, the light flux modulated by the second sub-pixel 12 (G light) is incident on the first position P11. In the following third state, as a result of the pixel shift in the second direction F2, the light flux modulated by the third sub-pixel 13 (B light) is incident on the first position P11. That is, all the color light fluxes are projected on the first position P11 in the following order: the R light→the G light→the B light.

The color light flux incident on the second position P12 transitions as follows: In the first state, the light flux modulated by the second sub-pixel 12 (G light) is incident on the second position P12. In the second state, as a result of the pixel shift in the first direction F1, the light flux modulated by the first sub-pixel 11 of another pixel 10 (R light) is incident on the second position P12. In the following third state, as a result of the pixel shift in the second direction F2, the light flux modulated by the fourth sub-pixel 14 of another pixel 10 (B light) is incident on the second position P12. That is, all the color light fluxes are projected on the second position P12 in the following order: the G light→the R light→the B light.

The color light flux incident on the third position P13 transitions as follows: In the first state, the light flux modulated by the third sub-pixel 13 (B light) is incident on the third position P13. In the second state, as a result of the pixel shift in the first direction F1, the light flux modulated by the fourth sub-pixel 14 of another pixel 10 (G light) is incident on the third position P13. In the following third state, as a result of the pixel shift in the second direction F2, the light flux modulated by the first sub-pixel 11 of another pixel 10 (R light) is incident on the third position P13. That is, all the color light fluxes are projected on the third position P13 in the following order: the B light→the G light→the R light.

The color light flux incident on the fourth position P14 transitions as follows: In the first state, the light flux modulated by the fourth sub-pixel 14 (R light) is incident on the fourth position P14. In the second state, as a result of the pixel shift in the first direction F1, the light flux modulated by the third sub-pixel 13 (B light) is incident on the fourth position P14. In the following third state, as a result of the pixel shift in the second direction F2, the light flux modulated by the second sub-pixel 12 of another pixel 10 (G light) is incident on the fourth position P14. That is, all the color light fluxes are projected on the fourth position P14 in the following order: the R light→the B light→the G light.

As described above, the R light, the G light, and the B light are projected in a time division manner in a one-frame display period on all the areas in the first position P11, the second position P12, the third position P13, and the fourth position P14. The four areas can therefore be displayed based on the superposition of the R light, the B light, and the G light on one another as if the four areas were independent pixels, whereby the resolution in the first direction F1 and the second direction F2 can be apparently doubled.

Primary Operational Effects of Present Embodiment

As described above, the optical module 2 according to the present embodiment includes the light modulator 4, which modulates light incident thereon for each of the pixels 10, and the pixel shift mechanism 5. The pixels 10 of the light modulator 4 each include the first sub-pixel 11, on which the first color light flux (R light) is incident, the second sub-pixel 12, on which the second color light flux (G light) is incident, the third sub-pixel 13, on which the third color light flux (B light) is incident, and the fourth sub-pixel 14, on which any of the first color light flux (R light), the second color light flux (G light), and the third color light flux (B light) is incident. The pixel shift mechanism 5 transitions to the first state, in which the light flux modulated by the first sub-pixel 11 is incident on the first position P11, the second state, in which the light flux modulated by the first sub-pixel 11 is incident on the second position P12, and the third state, in which the light flux modulated by the first sub-pixel 11 is incident on the third position P13. When the pixel shift mechanism 5 operates in the first state, the first color light flux (R light) is incident on the fourth sub-pixel 14. When the pixel shift mechanism 5 operates in the second state, the second color light flux (G light) is incident on the fourth sub-pixel 14. When the pixel shift mechanism 5 operates in the third state, the third color light flux (B light) is incident on the fourth sub-pixel 14.

The method for controlling the optical module 2 according to the present embodiment causes the first color light flux (R light) to be incident on the fourth sub-pixel 14 during the period for which the light flux modulated by the first sub-pixel 11 is incident on the first position P11, causes the second color light flux (G light) to be incident on the fourth sub-pixel 14 during the period for which the light flux modulated by the first sub-pixel 11 is incident on the second position P12, and causes the third color light flux (B light) to be incident on the fourth sub-pixel 14 during the period for which the light flux modulated by the first sub-pixel 11 is incident on the third position P13.

As described above, in the present embodiment, the pixel shift mechanism changes the on-projection-surface positions on which the light fluxes modulated by the four sub-pixels are incident, and the color light fluxes incident on one of the four sub-pixels (fourth sub-pixel 14) are swapped in synchronization with the pixel shift. The R light, the B light, and the G light can thus be projected in a time division manner on areas arranged at a sub-pixel interval smaller than the pixel interval Aλ on the screen 100, whereby the areas arranged at the sub-pixel interval smaller than the pixel interval Aλ can be displayed as if they are apparently independent pixels. An image having increased resolution can therefore be displayed, whereby the display quality can be improved.

The same color light flux keeps being incident on the first sub-pixel 11, the second sub-pixel 12, and the third sub-pixel 13 for a one-frame display period. No asynchronization between a display content and a shift position therefore occurs at the three sub-pixels. On the other hand, the color light flux incident on the remaining one sub-pixel (fourth sub-pixel 14) is switched three times in a one-frame display period. However, the frequency of switching of the contents displayed at the sub-pixel in synchronization with the pixel shift is lower in the present embodiment than in the related art, in which the shift position is switched four times in one frame. The proportion of the period for which the asynchronization between the content displayed at the fourth sub-pixel 14 and a shift position occurs is therefore small. A decrease in the display quality due to the asynchronization between a shift position and a display content is therefore small, whereby the increase in the resolution achieved by the pixel shift can improve the display quality.

In the liquid crystal panel 40, which sequentially drives the pixels 10 arranged in the display area 41, it takes about one second divided by the frame frequency to drive the pixels 10 from one end to the other end of the display area 41, so that there is an in-plane time difference, which could result in the asynchronization between the contents displayed at the sub-pixels that perform time-division display operation and a shift position. On the other hand, the frequency of switching of the contents displayed at the sub-pixels in synchronization with the pixel shift is small in the present embodiment, as described above, which means a small proportion of the period for which the asynchronization between the contents displayed at the fourth sub-pixel 14 and a shift position occurs due to the in-plane time difference resulting from the operation of driving the liquid crystal material in the sequential writing scheme. The increase in the resolution can therefore improve the display quality even when a low-response-speed liquid crystal material is used.

In the present embodiment, the pixel shift mechanism 5 performs the first shift operation, in which the first state is caused to transition to the second state, the second shift operation, in which the second state is caused to transition to the third state, and the third shift operation, in which the third state is caused to transition to the first state. The shift operation described above allows changes in the on-projection-surface positions where the light fluxes modulated by the four sub-pixels are incident.

In the present embodiment, the pixel shift mechanism 5 transitions to the first state, the second state, and the third state by combining the shift operation of shifting the optical path of the video image light L in the first direction F1 with the shift operation of shifting the optical path of the video image light L in the second direction F2, which intersects the first direction F1. The shift operation in the two directions described above allows transition to the three states. As an example of the combination of shift operation in one direction and shift operation in another direction, the pixel shift mechanism 5 in the present embodiment shifts the position where the video image light L modulated by the light modulator 4 is incident toward one side of the first direction F1 in the first shift operation, shifts the position where the video image light L is incident toward one side of the second direction F2, which intersects the first direction F1, in the second shift operation, and shifts the position where the video image light L is incident toward the other side of the first direction F1 and the other side of the second direction F2 in the third shift operation.

In the present embodiment, the first sub-pixel 11 and the second sub-pixel 12 are arranged in the first direction F1, and the third sub-pixel 13 and the fourth sub-pixel 14 are arranged in the first direction in positions different in the second direction from the positions of the first sub-pixel and the second sub-pixel. Further, when one of the first direction F1 and the second direction F2 is the row direction, and the other is the column direction, the first sub-pixel 11, the second sub-pixel 12, the third sub-pixel 13, and the fourth sub-pixel 14 are arranged in a matrix formed of two rows and two columns. Combining the sub-pixel arrangement described above with the pixel shift direction allows the R light, the B light, and the G light to be projected in a time division manner on the four areas arranged in the form of a lattice formed of two rows and two columns on the projection surface as if the four areas were apparently independent pixels. The resolution in the first direction F1 and the second direction F2 can therefore be apparently doubled. An image having increased resolution can therefore be displayed, whereby the display quality can be improved.

The optical modules 2 according to the present embodiment includes the light source section 3, which causes the first color light flux (R light), the second color light flux (B light), and the third color light flux (G light) to be incident on the light modulator 4, and can be used in a projection-type display apparatus, such as the projector 1 including the projection optical system 6, which enlarges and projects the video image light L incident from the optical module 2, whereby the resolution of an image projected on the screen 100 can be increased. The optical modules 2 according to the present embodiment can further suppress a decrease in brightness of the image projected on the screen 100.

Variations (1) The mechanism that switches the color light flux incident on the fourth sub-pixel 14 does not necessarily have the configuration in the embodiment described above. For example, the mechanism can employ a form in which the light source 37 for a fourth sub-pixel is replaced with a white light source and the optical element 38 is replaced with a rotary disc having a red color filter area, a green color filter area, and a blue color filter area. In the form described above, controlling the angular position of the rotary disc in synchronization with the pixel shift operation allows any of the R light, the G light, and the B light to be selectively incident on the fourth sub-pixel 14.

(2) The mechanism that switches the color light flux incident on the fourth sub-pixel 14 can employ another form in which the light source 37 for a fourth sub-pixel is replaced with the laser light source LB for B light and the optical element 38 is replaced with a rotary disc having a red phosphor area, a diffuser area, and a green phosphor area. In this configuration, controlling the angular position of the rotary disc in synchronization with the pixel shift operation allows any of the R light, the G light, and the B light to be selectively incident on the fourth sub-pixel 14.

What is claimed is:

1. An optical module comprising:
a light modulator that modulates light and includes a plurality of pixels; and
a pixel shift mechanism,
wherein the pixels of the light modulator each include a first sub-pixel on which a first color light flux is incident, a second sub-pixel on which a second color light flux is incident, a third sub-pixel on which a third color light flux is incident, and a fourth sub-pixel on which one of the first color light flux, the second color light flux, and third color light flux is incident,
the pixel shift mechanism includes a first state, a second state, and a third state,
the first color light flux is incident on the fourth sub-pixel in the first state,
the second color light flux is incident on the fourth sub-pixel in the second state, and
the third color light flux is incident on the fourth sub-pixel in the third state.

2. The optical module according to claim 1,
wherein the pixel shift mechanism performs a first shift operation of causing the first state to transition to the second state, a second shift operation of causing the second state to transition to the third state, and a third shift operation of causing the third state to transition to the first state.

3. The optical module according to claim 2,
wherein the light modulator is shifted toward a first direction in the first shift operation,
the light modulator is shifted toward a second direction that intersects the first direction in the second shift operation, and
the light modulator is shifted toward a third direction opposite to the first direction and a fourth direction opposite to the second direction in the third shift operation.

4. The optical module according to claim 3,
wherein the first sub-pixel and the second sub-pixel are arranged in the first direction, and
the third sub-pixel and the fourth sub-pixel are arranged in the first direction in positions different in the second direction from positions of the first sub-pixel and the second sub-pixel.

5. The optical module according to claim 4,
wherein
the first sub-pixel, the second sub-pixel, the third sub-pixel, and the fourth sub-pixel are arranged in a matrix formed of two rows and two columns.

6. A projection-type display apparatus comprising:
the optical module according to claim 1; and
a projection optical system that enlarges and projects video image light incident from the optical module.

7. A projection-type display apparatus comprising:
the optical module according to claim 2; and
a projection optical system that enlarges and projects video image light incident from the optical module.

8. A projection-type display apparatus comprising:
the optical module according to claim 3; and
a projection optical system that enlarges and projects video image light incident from the optical module.

9. A projection-type display apparatus comprising:
the optical module according to claim 4; and
a projection optical system that enlarges and projects video image light incident from the optical module.

10. A projection-type display apparatus comprising:
the optical module according to claim 5; and
a projection optical system that enlarges and projects video image light incident from the optical module.

11. A method for controlling an optical module including a light modulator and a pixel shift mechanism,
the light modulator modulating light and including a plurality of pixels,
the pixels of the light modulator each including a first sub-pixel on which a first color light flux is incident, a second sub-pixel on which a second color light flux is incident, a third sub-pixel on which a third color light flux is incident, and a fourth sub-pixel on which one of the first color light flux, the second color light flux, and the third color light flux is incident,
the method comprising:
causing the first color light flux to be incident on the fourth sub-pixel in a first state;
causing the second color light flux to be incident on the fourth sub-pixel in a second state; and
causing the third color light flux to be incident on the fourth sub-pixel in a third state.

12. The method for controlling an optical module according to claim 11, the method further comprising:
performing a first shift operation of causing the first state to transition to the second state;
performing a second shift operation of causing the second state to transition to the third state; and
performing a third shift operation of causing the third state to transition to the first state.

* * * * *